March 11, 1924.
M. J. McANENY
VALVE DEVICE
Filed Oct. 18, 1922    3 Sheets-Sheet 1
1,486,291
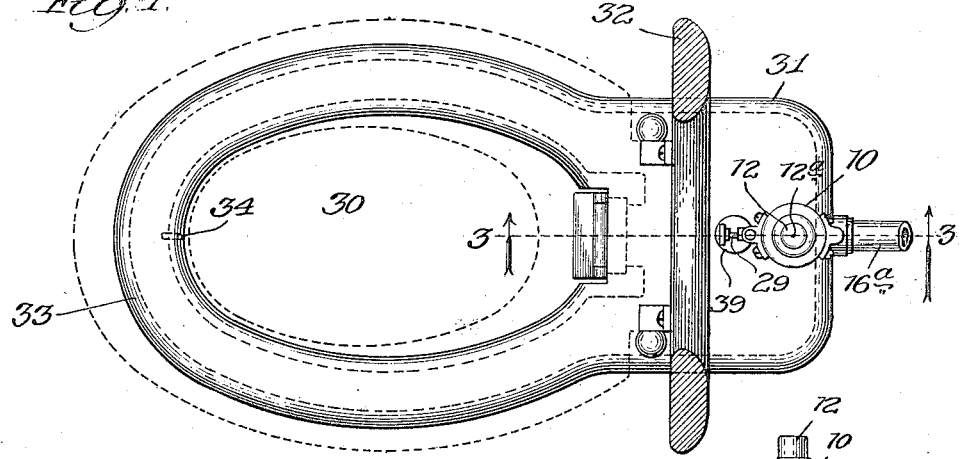
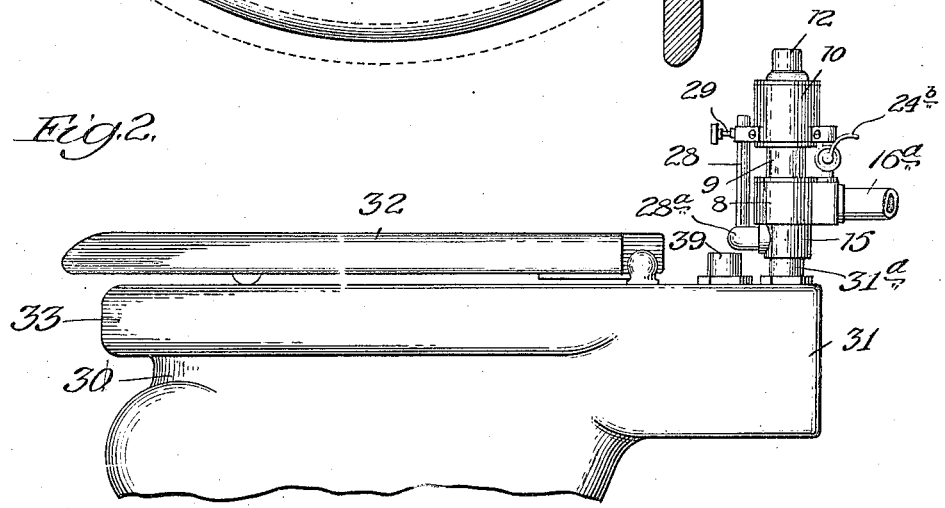
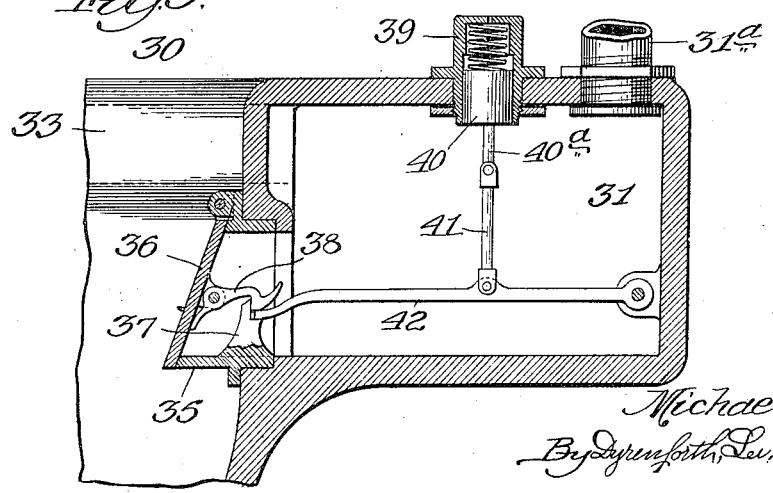
Inventor.
Michael J. McAneny,
By Dyrenforth, Lee, Chritton & Wiles,
Attys.

March 11, 1924.

M. J. McANENY

VALVE DEVICE

Filed Oct. 18, 1922  3 Sheets-Sheet 2

1,486,291

Inventor:
Michael J. McAneny,
By Dyrenforth, Lee, Chritton & Wiles,
Attys.

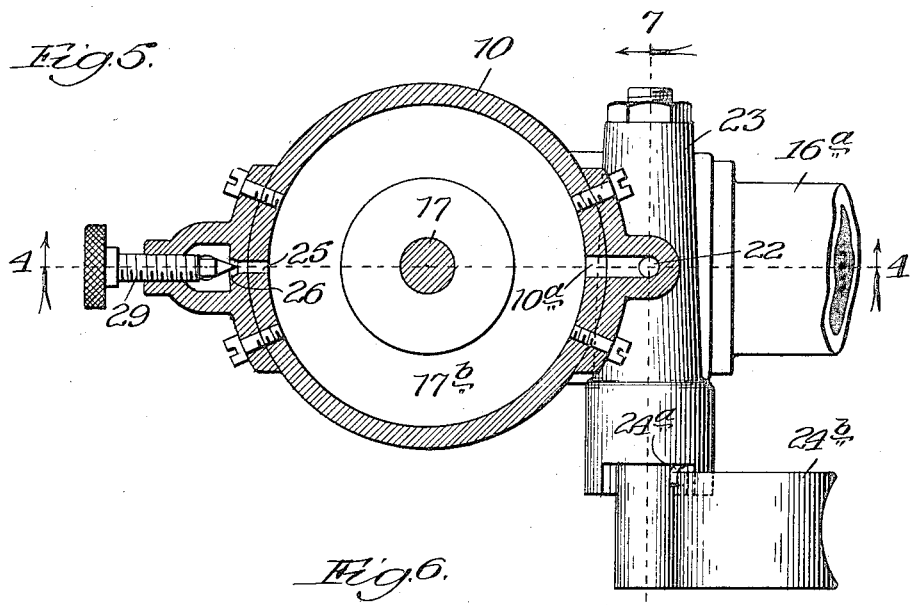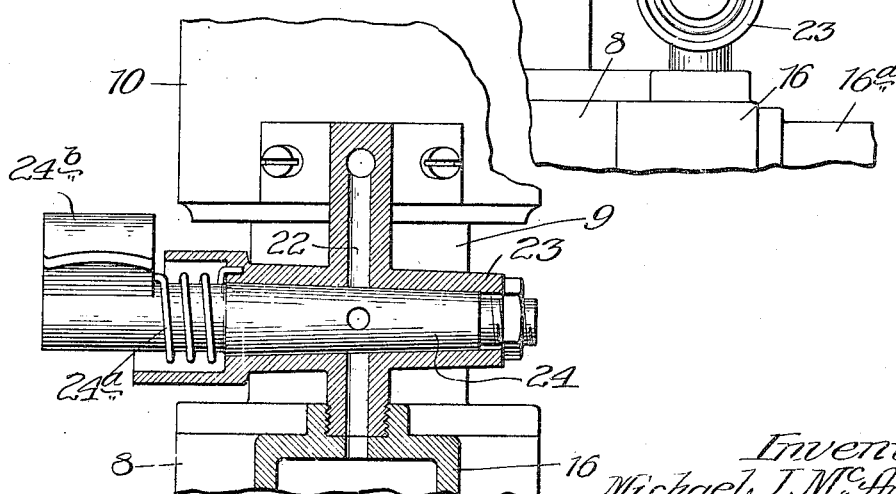

Patented Mar. 11, 1924.

1,486,291

UNITED STATES PATENT OFFICE.

MICHAEL J. McANENY, OF DENVER, COLORADO.

VALVE DEVICE.

Application filed October 18, 1922. Serial No. 595,333.

*To all whom it may concern:*

Be it known that I, MICHAEL J. MC-ANENY, a citizen of the United States, residing at Denver, in the county of Denver and State of Colorado, have invented a new and useful Improvement in Valve Devices, of which the following is a specification.

My invention relates to an improvement in valve-devices, and is fully described and explained in the specification and illustrated in the accompanying drawings, in which—

Figure 1 is a plan view, partly sectional, showing the valve device operatively applied to a water-closet bowl of special construction;

Figure 2 is a broken view of the same in side elevation;

Figure 3 is an enlarged broken view of a section on line 3—3, Fig. 1;

Figure 5 is a section on line 5—5, Fig. 4;

Figure 6 is a broken view illustrating a portion of the valve-device in elevation as represented at the right-hand side of Fig. 2, but enlarged over that showing, and Figure 7 is a broken sectional view on line 7—7, Fig. 5.

Figure 4:
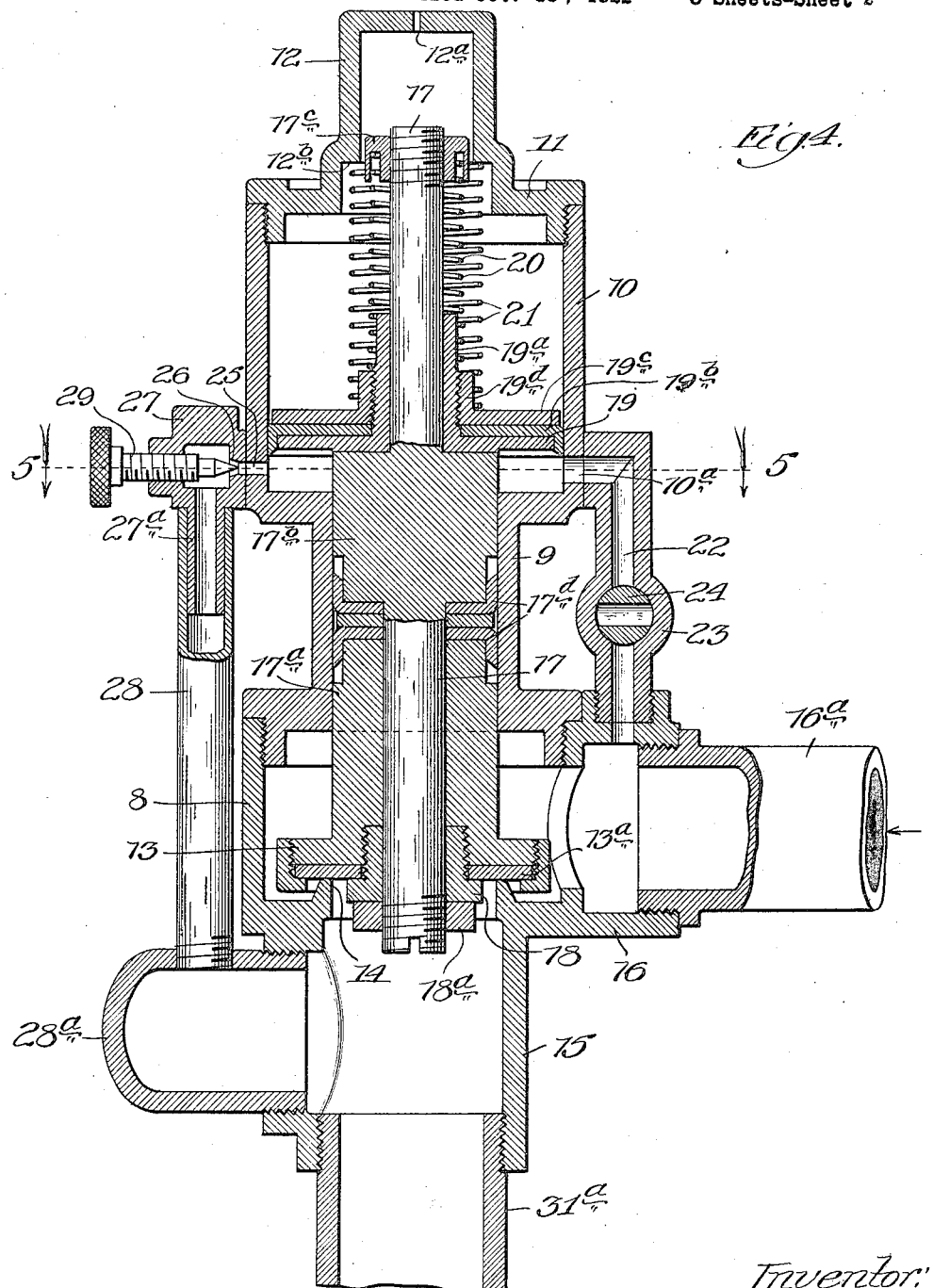
Figure 4 is a partly broken view illustrating a vertical section on line 4—4, Fig. 5, showing the valve-device in exaggerated size.

A valve-casing 8 (Fig. 4) has a hollow flanged neck 9 screwed into its upper end and surmounted by a piston-cylinder 10 having its upper end closed by a screw-cap 11 centrally from which a chamber 12 rises, provided with a vent-hole $12^a$ in its upper end. A valve 13 has a rubber gasket $13^a$ confined against its face to bear against a seat 14 formed about an opening in the bottom of the valve-casing, from which a tubular extension 15 depends and a nipple 16 projects laterally. The valve is formed on the lower end of a hollow valve-stem section $17^a$ slidably fitting within the lower part of the neck 9 and secured about the lower length of the valve-stem proper 17 by a hollow plug 18 screwed into the lower end of the section $17^a$ about the stem 17, on the lower end of which a nut $18^a$ is screwed against the plug to lock it in place, wherein the plug bears against the gasket $13^a$. The valve-stem 17 is provided with an enlargement $17^b$ to fit, like the section $17^a$, but above it, within the neck 9, and the stem extends from this enlargement centrally through the cylinder 10 into the vented chamber 12, wherein it carries on its upper end a head-forming nut $17^c$ shown to be recessed about its under face. Suitable packing is shown at $17^d$ (Fig. 4) to be provided about the valve-stem between its enlargements $17^a$ and $17^b$.

A spring-pressed piston 19 works in the cylinder 10 and is loose about the valve-stem portion therein, which is loosely surrounded by an externally-threaded sleeve $19^a$ rising from and carrying the piston, the latter being provided with suitable packing $19^b$ secured in place by a nut $19^c$ having an internally-threaded collar $19^d$ screwed on the sleeve $19^a$ against the packing. A coiled spring 20 surrounds the valve-stem in the cylinder, being endwise confined between the nut $17^c$, at the recess therein, and the shoulder-forming end of a collar $19^d$ on the nut $19^c$; and another coiled spring 21 surrounds the spring 20 in the cylinder and is endwise confined between a shoulder $12^b$ in the cap 11 and the nut $19^c$.

A tubular duct 22 connects the nipple 16 with the lower end of the cylinder 10 at the inlet $10^a$ thereof and has interposed in it a valve-chamber 23 containing a rotary spring-pressed valve 24 (Fig. 7), normally maintained in the position, shown in Fig. 4, of closing the duct by a spring $24^a$ coiled about its projecting end (Fig. 6), which carries a curved finger $24^b$ or handle by which to manipulate the valve for turning it to register its port with the passage through the duct 22.

Opposite the inlet of the duct 22 into the cylinder 10 there leads therefrom a discharge-outlet 25 communicating with a passage 26 to a hollow head 27 having a depending tubular stem $27^a$ entering the upper end of a vertical pipe 28, which terminates at its lower end in a chamber $28^a$, or enlargement discharging into the tubular extension 15. A needle-valve 29 works in the head 27 for regulating, as and for the purpose hereinafter explained, the rate of evacuation of the chamber or space beneath the piston in the cylinder 10, of liquid fed thereto.

While my valve-device is advantageously useful in various connections wherein it is desirable to produce a sudden gush of liquid or other fluid under pressure into a receptacle, and particularly in measured or predetermined quantity, as, for example, at automobile filling-stations for supplying predetermined quantities of gasoline to cars, I have especially designed it for flushing water-closet bowls, and it is therefore so illustrated in the drawings and the description thereof and that of its operation hereinafter contained are confined to that particular connection, wherein it is especially advantageous in the matter of economizing water by producing the flushing thoroughly with the minimum quantity thereof; in being immediately ready, after each flushing for repeating it, and in operating readily under any head of water, whether the pressure be one pound or a hundred pounds or more to the square inch, without varying the quantity discharged for flushing or requiring adjustment or adaptation for different pressures. Moreover, the valve-device is illustrated in the accompanying drawings in cooperative relation to a preferred construction of water-closet-bowl, most clearly shown in Figs. 1 to 3, inclusive, and described as follows;

The bowl 30 represented is of a usual general shape provided with a rear chamber 31 on which the seat 32 is hinged in an ordinary manner. The rim 33 about the upper edge of the bowl is formed hollow to afford a water-receptacle, which has a vent-opening 34 (Fig. 1) at the forward end of the bowl and opens at its rear ends into the chamber at opposite sides of an inclined valve-seat 35, provided in the forward end thereof, for a flap-valve 36 (Fig. 3) hinged to swing to and from the seat. A catch 37 rises from the base of the seat 35, and on the inner face of the valve is pivoted, in position to engage the catch 37, a dog 38. A vented cylinder 39 extends into the chamber 31 through its top and contains a spring-pressed piston 40 having its pendent stem 40$^a$ connected by a link 41 with a lever 42 between the ends of the latter, which is fulcrumed at one end to the rear wall of the chamber 31 and extends at its forward end to the catch 36.

Water flowing into the chamber 31 fills the bowl-rim 33 and the chamber, the combined capacities of which may be somewhat less than one and one-half gallons. The resultant pressure of the water in the chamber and that flowing into it from the rim raises the piston 40 to cause the lever 42 to trip the dog 38 and release the valve 36, which the water-pressure against it opens to permit the water to discharge into and flush the bowl. With the forceful and gushing discharge from the chamber 31 the spring-pressure on the piston 40 depresses the latter to lower the lever 42 into the notch of the catch 37, and the valve 36 closes by gravity against its seat, while the dog 38 rides over the catch against the adjacent lever-end to lock the valve in its seated position, wherein the dog is again ready to be tripped in the next flushing operation.

The valve-device (Fig. 4) controls the supply of flushing-water to the bowl and also regulates it, as hereinafter described. For these purposes the device is coupled, at the tubular extension 15, to a pipe 31$^a$, or nipple extending through the top of the chamber 31; and the nipple 16 on the valve casing 8 is coupled to a pipe 16$^a$ leading from a source of water under pressure, which may be the full city-pressure of any number of pounds to the square inch, or a reservoir, or an ordinary overhead or rear flush-tank more usually provided for toilet-bowl flushing, though with my valve-device such tank is unnecessary and may be dispensed with, thereby saving equipment and space.

With the valve-device in place, to produce the flushing the operator manipulates the handle 24$^b$ by merely snapping it for rotating the valve 24 to register its port with the duct 22 and produce a sudden rush of water from the pipe 16$^a$ into the casing 8 about the valve 13 therein, and through the duct 22 into the cylinder 10 below the piston 19. The resultant pressure on the piston raises it to compress the spring 20 and 21 until stopped by the sleeve 19$^a$ striking the nut 17$^c$, the tension of the inner spring 20 being meantime insufficient to unseat the valve 13. By the resultant encounter of the sleeve 19$^a$ with the nut 17$^c$ to start the valve and compression of the inner spring 20, the tension of the latter is rendered sufficient to overcome the resistance of the valve 13, and the spring recoils against the nut to shoot the stem into the chamber 12 and quickly and fully unseat the valve to permit water from the pipe 16$^a$ to rush past the valve through the extension 15 and nipple 31$^a$ into the chamber 31 while the valve remains open, as it will while water remains in the cylinder 10 under the piston 19. However, that water bleeds out more or less gradually through the valve-controlled passages 25 and 26, head 27, pipe 28, chamber 28$^a$ and nipple 31$^a$ into the bowl-chamber 31, and when it is exhausted from underneath the piston 19 the valve seats itself by gravity supplemented by the recoil-force of the previously compressed spring 21 if provided though it need not be should gravity and the pressure of water from pipe 16$^a$ be sufficient to quickly seat the valve 13 for shutting off the flushing supply from the pipe 16$^a$.

By properly setting the needle-valve 29, the outflow past it of water from underneath the piston 19 may be so regulated or timed as to have permitted only the predetermined and comparatively small quantity to enter the bowl-chamber and rim 33 to their combined capacity when the valve 13 becomes seated; and when once set for any such capacity, the regulation will be permanent therefor irrespective of the pressure or head of water from its source of supply.

As will be understood, the valve 24 need remain open only momentarily, being snapped into closed position by the recoil-force of its spring 24ª upon releasing the handle 24ᵇ, since the gush of water into the cylinder beneath the piston 19 is sufficient during such momentary open condition of the valve 24, to compress the spring 20 for its recoil-action in raising the valve 13.

I realize that considerable variation is possible in the details of construction of the valve-device herein shown and described, and I do not intend to limit my invention thereto except as pointed out in the appended claims, in which it is my intention to claim all the novelty inherent in the invention as broadly as permissible by the state of the art.

I claim:

1. A valve-device comprising a valve-casing provided with an inlet and an outlet, piston-mechanism having spring-raised piston and an inlet and an outlet, a valve seating in the casing against its outlet and having a stem passing loosely through and confining the piston against the spring, said piston-mechanism inlet having valved communication with the casing-inlet for controllably introducing fluid under pressure from the supply thereto to the piston-mechanism to initially unseat it and compress said spring for fully opening by its recoil the valve in the casing.

2. A valve-device comprisng a valve-casing provided with an inlet and an outlet, a cylinder having an inlet and an outlet and valved communication between its inlet and the casing-inlet, a valve seating in the casing against its outlet and having a stem extending into the cylinder, a piston movable along the stem in the cylinder and seating above said inlet thereto, and a valve-raising spring confined by the stem against the piston to be compressed by the rise thereof and thereafter expand in the direction of compression to fully open the valve.

3. A valve-device comprising a valve-casing provided with an inlet and an outlet, a cylinder having an inlet and an outlet and valved communication between its inlet and the casing-inlet, a valve seating in the casing against its outlet and having a stem extending into the cylinder, a piston movable along the stem in the cylinder, a regulating valve in the cylinder-outlet, and a valve-raising spring confined by the stem against the piston.

4. A valve-device comprising a valve-casing provided with an inlet and an outlet, a cylinder having an inlet and an outlet provided with a discharge-regulating valve, a duct connecting the casing and cylinder inlets and containing a rotary spring-closed valve, a valve seating in the casing against its outlet and having a stem extending into the cylinder, a piston movable along said stem in the cylinder, and a valve-raising spring confined by the stem against the piston.

5. A valve-device comprising a valve-casing provided with an inlet and an outlet, a cylinder having an outlet provided with a discharge-regulating valve and an inlet controllably communicating with the casing-inlet through a valved duct, a chamber surmounting the cylinder, a valve seating in the casing against its outlet and having a stem extending through the cylinder into said chamber, a piston movable along said stem in the cylinder, and a valve-raising spring confined by the stem against the piston.

6. A valve-device comprisng a valve-casing provided with an inlet and an outlet, a cylinder provided with an outlet having a pipe-connection with the casing-outlet, a needle-valve in said pipe-connection cooperating with said cylinder-outlet to regulate the discharge therethrough, a valved duct connecting the casing and cylinder inlets, a valve seating in the casing against its outlet and having a headed stem extending in the cylinder, a piston movable along said stem in the cylinder, and a valve-raising spring surrounding the stem and confined between the head thereon and the piston.

7. A valve-device comprisng a valve-casing provided with an inlet and an outlet and surmounted by a neck terminating in a cylinder provided with an inlet having a valved duct-connection with the casing-inlet and an outlet provided with a discharge-regulating valve, a valve seating in the casing against its outlet and having a headed stem extending in the cylinder and provided with enlargements in said neck, a piston movable along the stem in the cylinder and provided with a stop, and a coiled spring surrounding the stem and confined between the head thereon and the piston to be compressed by rise of the piston until said stop encounters said head and thereupon recoil to raise the valve from its seat.

MICHAEL J. McANENY.